(12) United States Patent
Leung

(10) Patent No.: US 12,172,691 B2
(45) Date of Patent: Dec. 24, 2024

(54) CAMPING CART

(71) Applicant: ZHONGSHAN VIGOR HOUSEHOLD GOODS CO., LTD, Guangdong (CN)

(72) Inventor: David Leung, Guangdong (CN)

( * ) Notice: Subject to any disclaimer, the term of this patent is extended or adjusted under 35 U.S.C. 154(b) by 229 days.

(21) Appl. No.: 18/082,895

(22) Filed: Dec. 16, 2022

(65) Prior Publication Data

US 2024/0157991 A1 May 16, 2024

(30) Foreign Application Priority Data

Nov. 15, 2022 (CN) .......................... 202211429451.8

(51) Int. Cl.
*B62B 3/02* (2006.01)
*B62B 5/06* (2006.01)

(52) U.S. Cl.
CPC .............. *B62B 3/022* (2013.01); *B62B 5/065* (2013.01)

(58) Field of Classification Search
CPC B62B 3/022; B62B 3/027; B62B 3/02; B62B 3/00; B62B 5/065; B62B 5/06; B62B 5/02; B62B 5/04; B62B 5/0404; B62B 5/0457; B62B 5/0461; B62B 5/0476
See application file for complete search history.

(56) References Cited

U.S. PATENT DOCUMENTS

| | | | | |
|---|---|---|---|---|
| 3,366,201 A | * | 1/1968 | Pesta | B62B 5/0423 188/110 |
| 4,591,175 A | * | 5/1986 | Upton | B60B 33/00 280/33.994 |
| 4,609,075 A | * | 9/1986 | Snedeker | B62B 5/0423 280/33.994 |
| 8,002,363 B2 | * | 8/2011 | Cheng | B60B 33/0068 301/121 |
| 8,011,686 B2 | * | 9/2011 | Chen | B62B 3/106 280/87.01 |
| 9,056,621 B1 | * | 6/2015 | Jin | B62B 3/027 |
| 9,073,564 B2 | * | 7/2015 | Yang | B62B 3/002 |
| 9,211,897 B2 | * | 12/2015 | Yang | B62B 3/001 |
| 9,580,095 B2 | * | 2/2017 | Vargas, II | B62B 3/02 |
| 9,738,298 B1 | * | 8/2017 | Yang | B62B 3/025 |
| 10,040,470 B1 | * | 8/2018 | Horowitz | B62B 3/102 |
| 10,099,711 B1 | * | 10/2018 | Sun | B62B 3/007 |
| 10,099,712 B1 | * | 10/2018 | Sun | B62B 5/067 |

(Continued)

FOREIGN PATENT DOCUMENTS

| | | |
|---|---|---|
| CN | 215361423 U | 12/2021 |
| CN | 216401468 U | 4/2022 |

*Primary Examiner* — James M Dolak

(57) ABSTRACT

The present disclosure discloses a camping cart, which comprises a moving part, an X-shaped supporting foldable part, an X-shaped connecting part and a load-bearing bottom rod. The moving part comprises a front wheel and a universal wheel, the front wheel is installed at the front end of the X-shaped supporting foldable part; wherein the surface of the front wheel is covered with an electric conductor, the front wheel is rotatably connected with a frame, the front wheel rolls pivotably in the frame, a magnet frame is built in the frame, the magnet frame is located on the upper side of the front wheel, a magnet is provided on one side of the magnet frame close to the front wheel, and the magnet frame is capable of rising and falling in the frame to adjust the distance between the magnet frame and the front wheel.

10 Claims, 4 Drawing Sheets

(56) References Cited

U.S. PATENT DOCUMENTS

| | | | | |
|---|---|---|---|---|
| 10,399,586 B1* | 9/2019 | Huang | ................... | B62B 5/06 |
| 10,633,010 B1* | 4/2020 | Zhang | ................... | B62B 3/025 |
| 10,836,418 B2* | 11/2020 | Zhu | ................... | B62B 3/025 |
| 10,953,903 B1* | 3/2021 | Park | ................... | B62B 3/007 |
| 10,953,904 B1* | 3/2021 | Sun | ................... | B62B 3/002 |
| 11,332,178 B2* | 5/2022 | Yang | ................... | B62B 5/067 |
| 11,370,467 B1* | 6/2022 | Horowitz | ................... | B62B 3/007 |
| 11,851,097 B2* | 12/2023 | Chu | ................... | B62B 5/067 |
| 11,932,298 B2* | 3/2024 | Sun | ................... | B62B 3/007 |
| 11,958,520 B1* | 4/2024 | Sun | ................... | B62B 5/067 |
| 12,012,139 B2* | 6/2024 | Sun | ................... | B62B 3/007 |

* cited by examiner

CAMPING CART

TECHNICAL FIELD

The present disclosure relates to the field of carts or cart products, in particular to a camping cart.

BACKGROUND

Campers arrive at camping sites on foot or by car, usually in valleys, lakes and seashores. Campers can build a campfire, have a barbecue, have a picnic or sing, which are also the most common camping activities. In the process of camping, cars often cannot enter camping sites, so that many things, such as tents, food and so on, have to be carried by manpower. For this reason, the patent with Patent No. 202210836402.X discloses a portable folding push-pull cart, which comprises a walking wheel assembly, four shock-absorbing elements, a foldable load-bearing bottom frame, a foldable main frame, a telescopic handle assembly and cloth pockets. The portable folding push-pull cart is excellent in shock-absorbing performance and is very suitable for the rugged and vibrating road conditions in outdoor camping. Compared with the conventional cart, the overall volume of the cart is larger, and the folded size becomes smaller. However, the push-pull cart cannot be braked during use. If the road surface has a certain angle, the camping cart can easily slide backward and cannot be fixed in the use position. The applicability of the use scene is not sufficient.

SUMMARY

The present disclosure aims at solving at least one of the technical problems existing in the prior art. Therefore, the present disclosure provides a camping cart, which can be braked at any position and improve the applicability of the use scene.

The embodiment of a first aspect of the present disclosure provides a camping cart comprising a moving part, an X-shaped supporting foldable part, an X-shaped connecting part and a load-bearing bottom rod; wherein every two of the X-shaped supporting foldable parts are rotatably connected through a first rotating element to construct one side of the camping cart; two of the X-shaped connecting parts are connected to both ends of the X-shaped supporting foldable part 200 through an upper connector and a lower connector, respectively, to construct both ends of the camping cart, wherein the upper connector is connected to the upper end of the X-shaped connecting part and the upper end of the X-shaped supporting foldable part, respectively, and the lower connector is connected to the lower end of the X-shaped connecting part and the lower end of the X-shaped supporting foldable part; four load-bearing bottom rods are provided, one end, of each of the four load-bearing bottom rods is rotatably connected to the same second rotating element, and one end of the load-bearing bottom rod far away from the second rotating element is rotatably connected with the lower connector; the moving part comprises a front wheel and a universal wheel, the front wheel is installed at the front end of the X-shaped supporting foldable part, and the universal wheel is installed at the rear end of the X-shaped supporting foldable part; wherein the surface of the front wheel is covered with an electric conductor, the front wheel is rotatably connected with a frame, the front wheel rolls pivotably in the frame, a magnet frame is built in the frame, the magnet frame is located on the upper side of the front wheel, a magnet is provided on one side of the magnet frame close to the front wheel, and the magnet frame is capable of rising and falling in the frame to adjust the distance between the magnet frame and the front wheel.

The camping cart provided by the embodiment of the present disclosure has at least the following beneficial effects. By adjusting the distance between the magnet and the front wheel, the magnetic field resistance generated between the magnet and the electric conductor can be adjusted, so that the braking force can be effectively generated on the front wheel, the camping cart can be conveniently braked at different positions, the camping cart can be prevented from sliding at will, and the applicability of the use scene can be improved.

According to some embodiments of the present disclosure, the magnet frame is connected with a stretching rod, the stretching rod penetrates through the frame and is movable telescopically on the frame, one end of the stretching rod far away from the magnet frame is connected with a stretching control element, and the stretching control element is configured to control the stretching rod to extend and retract.

According to some embodiments of the present disclosure, the frame is further inserted with a guide post, the guide post is slidable on the frame, the end of the guide post is fixedly connected with the magnet frame, two guide posts are provided, the two guide posts are located on both sides of the stretching rod, and a fixed plate is fixedly connected between the guide post and the stretching rod.

According to some embodiments of the present disclosure, the guide post is sleeved with a spring.

According to some embodiments of the present disclosure, the middle of the stretching rod is provided with a threaded section, the threaded section is engaged with a positioning nut, and the positioning nut abuts against the surface of the frame to fix the position of the magnet frame.

According to some embodiments of the present disclosure, two magnets are provided, the two magnets are provided at an included angle, and the magnet is tangent to the front wheel.

According to some embodiments of the present disclosure, the X-shaped supporting foldable part comprises:
- a third rotating element, wherein the third rotating element is provided with two rotating installing sites, the two rotating installing sites are provided side by side and horizontally, the third rotating element is provided with two sleeves, and the two sleeves face opposite directions and are located on the same straight line;
- a first rod, wherein the first rod is inserted into one of the sleeves and is rotatably connected with the lower connector;
- a second rod, wherein the second rod is inserted into the other sleeve and is rotatably connected with the second rod of the adjacent X-shaped supporting foldable part 200 through the first rotating element;
- a third rod, wherein one end of the third rod is rotatably connected with one of the rotating installing sites, and the other end thereof is rotatably connected with the upper connector;
- a fourth rod, wherein the rod body of the fourth rod is rotatably connected with the other rotating installation position, one end of the fourth rod is rotatably connected with the first rotating element, and the other end thereof is fixedly connected with a slider, and the slider is slidably matched with the rod body of the third rod and is slidable along the third rod.

According to some embodiments of the present disclosure, the camping cart further comprises a cloth pocket, wherein the cloth pocket is fixedly connected with four of the upper connectors and four of the lower connectors.

According to some embodiments of the present disclosure, the camping cart further comprises a handle assembly, wherein the handle assembly comprises:

short rods, wherein two short rods are provided, one end of each of the two short rods is rotatably connected through a fourth rotating, element, and the other end thereof is rotatably connected with two lower connectors, respectively, wherein the two lower connectors are provided to correspond to the two universal wheels, respectively;

a handle rod, wherein the handle rod is fixedly connected with the fourth rotating element.

According to some embodiments of the present disclosure, the handle rod is telescopic.

Additional aspects and advantages of the present disclosure will be set forth in part in the following description, and will be obvious from the following description in part, or may be learned by practice of the present disclosure.

BRIEF DESCRIPTION OF THE DRAWINGS

The present disclosure will be further explained with reference to the following drawings and embodiments, in which.

Figure 1:
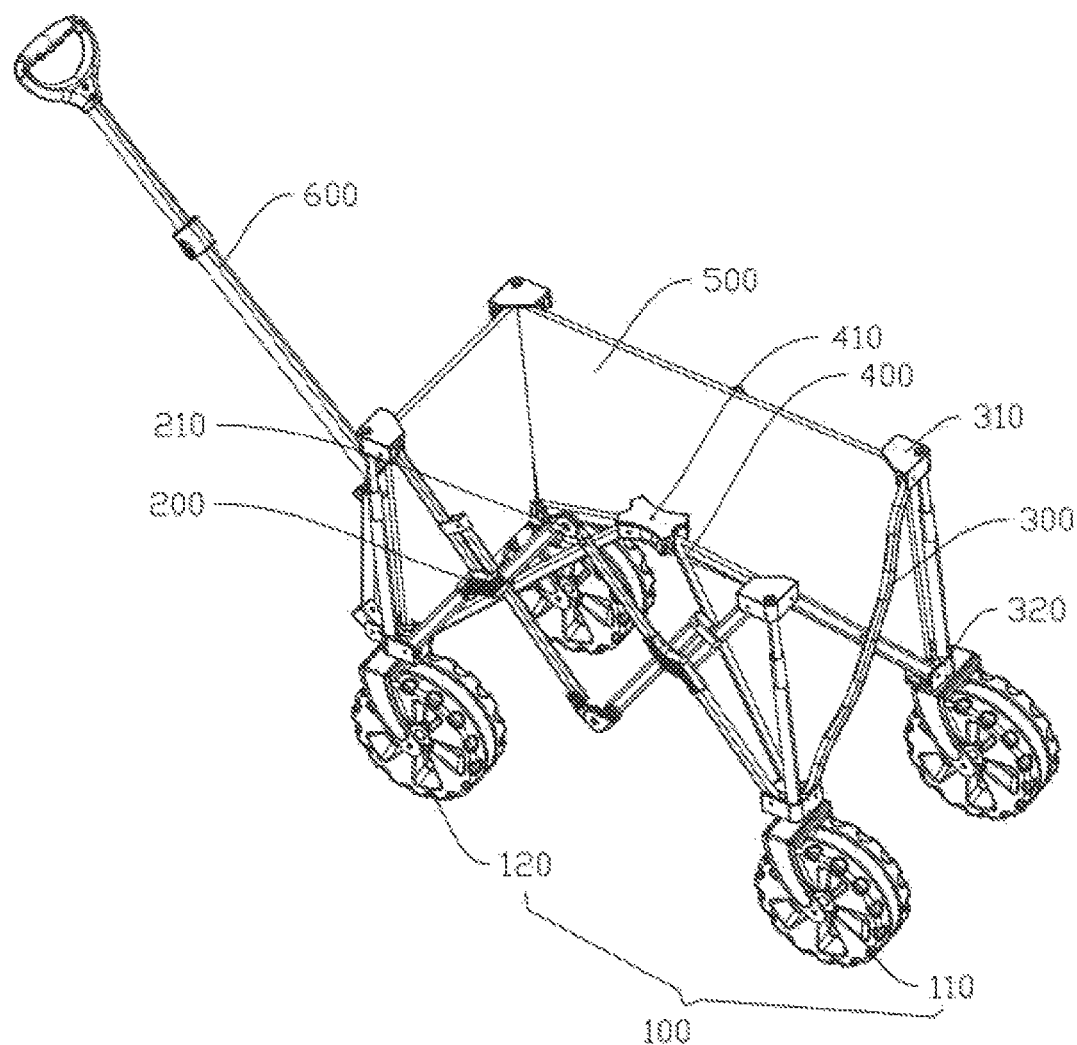
FIG. 1 is a schematic diagram of one direction of a camping cart according to an embodiment of the present disclosure.

100. Moving part; 110. Front wheel; 111. Electric conductor; 112. Frame; 1121. Guide post; 1122. Spring; 113. Magnet frame; 1131. Magnet: 1132. Stretching rod; 1133. Stretching control element; 1134. Threaded section; 1135. Positioning nut; 120. Universal wheel; 200. X-shaped supporting foldable part; 210. First rotating element; 220. Third rotating element; 230. First rod; 240. Second rod; 250. Third rod; 260. Fourth rod; 261. Slider; 300. X-shaped connecting part; 310. Upper connector; 320. Lower connector; 400. Load-bearing bottom rod; 410. Second rotating element; 500. Cloth pocket; 600. Handle assembly; 610. Short rod; 611. Fourth rotating element; 620. Handle rod.

DETAILED DESCRIPTION OF THE EMBODIMENTS

The embodiments of the present disclosure will be described in detail hereinafter. The examples of the embodiments are shown in the accompanying drawings, in which the same or similar reference numerals refer to the same or similar elements or the elements with the same or similar functions throughout. The embodiments described with reference to the accompanying drawings hereinafter are exemplary, which is only used for explaining the present disclosure and should not be construed as limiting the present disclosure.

In the description, of the present disclosure, it should be understood that the orientational or positional relationships related to the directions, such as up, down, front, back left, right, etc., are based on the orientational or positional relationships shown in the drawings, which is only used to facilitate the description of the present disclosure and simplify the description, rather than indicate or imply that the referred devices or elements must have a specific direction, be constructed and operated in a specific direction. Therefore, it cannot be understood as a limitation of the present disclosure.

In the description of the present disclosure, "several" meanings more than one, "a plurality of" meanings more than two, "greater than, less than, more than, etc." are understood as excluding the number itself, and "above, below, within, etc." are understood as including the number itself. If a first and a second are described, they are only used for the purpose of distinguishing technical features, but cannot be understood as indicating or implying relative importance, or implicitly indicating the number of indicated technical features or implicitly indicating the sequence of indicated technical features.

In the description of the present disclosure, unless otherwise explicitly stated, words such as providing, installing, connecting, etc. should be understood in a broad sense. Those skilled in the art can reasonably determine the specific meanings of the above words in the present disclosure in combination with the specific contents of the technical scheme.

Referring to FIGS. 1 to 4, the camping cart of the embodiment of the present disclosure comprises a moving part 100, an X-shaped supporting foldable part 200, an X-shaped connecting part 300 and a load-bearing bottom rod 400. Every two of the X-shaped supporting foldable parts 200 are rotatably connected through a first rotating element 210 to construct one side of the camping cart. Two of the X-shaped connecting parts 300 are connected to both ends of the X-shaped supporting foldable part 200 through an upper connector 310 and a lower connector 320, respectively, to construct both ends of the camping cart. The upper connector 310 is connected to the upper end of the X-shaped connecting part 300 and the upper end of the X-shaped supporting foldable part 200, respectively, and the lower connector 320 is connected to the lower end of the X-shaped connecting part 300 and the lower end of the X-shaped supporting foldable part 200, respectively. The X-shaped connecting part 300 comprises two rods rotating to each other. The middle of the two rods is pivoted by a structure such as a rotating shaft to realize the folding effect. Four load-bearing bottom rods 400 are provided. One end of each of the four load-bearing bottom rods 400 is rotatably connected to the same second rotating element 410, and one end of the load-bearing bottom rod 400 far away from the second rotating element 410 is rotatably connected with the lower connector 320. The four load-bearing bottom rods 400 can be rotated around the second rotating element 410 to fold the whole camping cart in cooperation with the X-shaped supporting foldable part 200 and the X-shaped connecting part 300.

Figure 3:
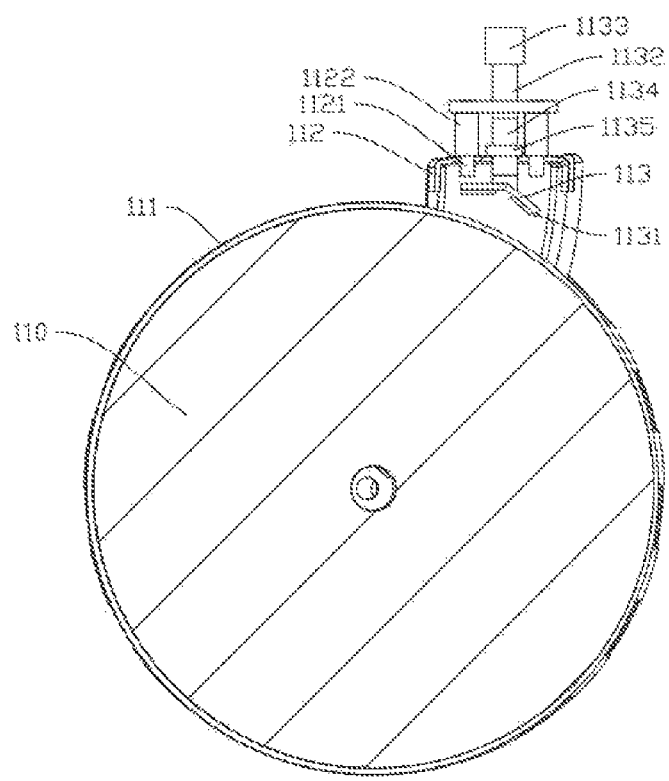
FIG. 3 is a schematic cross-sectional view of a front wheel of a camping cart according to an embodiment of the present disclosure.

It should be emphasized that the moving part 100 comprises a front wheel 110 and a universal wheel 120. The front wheel 110 is installed at the front end of the X-shaped supporting foldable part 200, and the universal wheel 120 is installed at the rear end of the X-shaped supporting foldable part 200. Referring to FIG. 3, the surface of the front wheel 110 is covered with an electric conductor 111. The front wheel 110 is rotatably connected with a frame 112. The front wheel 110 rolls pivotably in the frame 112. A magnet frame 113 is built in the frame 112. The magnet frame 113 is located on the upper side of the front wheel 110. A magnet 1131 is provided on one side of the magnet frame 113 close to the front wheel 110. The magnet frame 113 is capable of rising and falling in the frame 112 to adjust the distance between the magnet frame 113 and the front wheel 110.

In the camping cart of the embodiment of the present disclosure, the X-shaped supporting foldable part 200, the X-shaped connecting part 300 and the load-bearing bottom rod 400 can provide a folding and storing mode for the whole camping cart. Specifically, when the camping cart needs to be stored and carried, each part of the camping cart is folded to reduce the volume, and when the camping cart needs to be used to contain articles, each part is unfolded to open the cloth pocket 500 placed therein. Specifically, the cloth pocket 500 is fixedly connected with the four upper connectors 310 and the four lower connectors 320, and articles are contained in the cloth pocket 500. The front wheel 110 and the universal wheel 120 of the moving part 100 provide the functions of moving and steering, respectively. When the camping cart is, pushed to an area where camping is required, the magnet 1131 on the magnet frame 113 is controlled to approach the front wheel 110, so that when the front wheel 110 trends to rotate, the electric conductor 111 will cut the magnetic line of force and form an eddy current. The eddy current reacts on the magnetic field to do work, so that the front wheel 110 generates resistance in the opposite direction of movement, thus effectively controlling the front wheel 110, preventing the cart from continuing to rotate on the road ahead, and achieving the function of braking the whole camping cart. On different slopes, the distance between the magnet 1131 and the front wheel 110 with the electric conductor 111 can be adjusted to adjust the resistance. According to the laws of physics, the closer the distance between the magnet 1131 and the electric conductor 111, the greater the resistance.

To sum up, by adjusting the distance between, the magnet 1131 and the front wheel 110, the magnetic field resistance generated between the magnet 1131 and the electric conductor can be adjusted, so that the braking force can be effectively generated on the front wheel 110, the camping cart can be conveniently braked at different positions, the camping cart can be prevented from sliding at will, and the applicability of the use scene can be improved.

The electric conductor 111 can be a non-ferromagnetic conductive aluminum ring, and the magnet 1131 is a permanent magnet.

It should be understood that, referring to FIG. 3, the magnet frame 113 is connected with a stretching rod 1132. The stretching rod 1132 penetrates through the frame 112 and is movable telescopically on the frame 112. One end of the stretching rod 1132 far away from the magnet frame 113 is connected with a stretching control element. The stretching control element is configured to control the stretching rod 1132 to extend and retract. The stretching rod 1132 extends and retracts the on the frame 112 so as to adjust the distance between the magnet 1131 on the magnet frame 113 and the electric conductor 111. Further, in order to prevent the stretching rod 1132 from pivoting during the extending and retracting movement, the frame 112 is further inserted with a guide post 1121. The guide post 1121 is slidable on the frame 112. The end of the guide post 1121 is fixedly connected with the magnet frame 113. Two guide posts 1121 are provided. The two guide posts 1121 are located on both sides of the stretching, rod 1132. A fixed, plate is fixedly connected between the guide post 1121 and the stretching rod 1132. By the fixation of the fixed plate, the guide post 1121 moves while the stretching rod 1132 moves. The two guide posts 1121 constrain the stretching rod 1132 so that the stretching rod 1132 cannot be pivoted.

At the same time, for the convenience of use, the guide post 1121 is sleeved with a spring 1122. The spring 1122 is provided between the fixed plate and the frame 112 to drive the fixed plate to move towards one end far away from the frame 112. In actual use, when it is not necessary to fix the position of the whole camping cart, the position of the stretching rod 1132 is released. The magnet 1131 is far away from the electric conductor 111 due to the elastic force of the spring 1122, which reduces the resistance and facilitates the user to push the camping cart The structure for fixing the position of the stretching rod 1132 is fixed by means of thread engagement. Specifically, the middle of the stretching rod 1132 is provided with a threaded section 1134. The threaded section 1134 is engaged with a positioning nut 1135. The positioning nut 1135 abuts against the surface of the frame 112 to fix the position of the magnet frame 113.

In order to improve the constraining resistance to the front wheel 110, two magnets 1131 are provided. The two magnets 1131 are provided at an included angle. The magnet is tangent to the front wheel 110, thereby improving the eddy current resistance to the front wheel 110.

Figure 4:
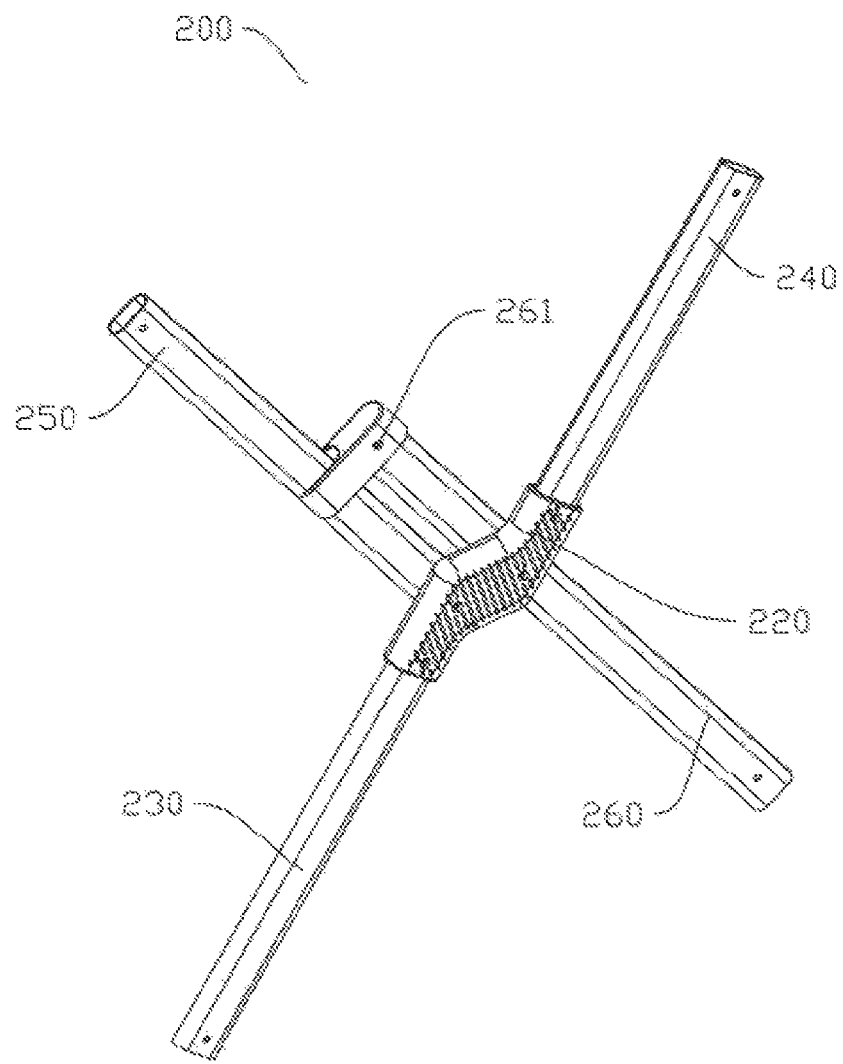
FIG. 4 is a schematic diagram of an X-shaped supporting foldable part of a camping cart according to an embodiment of the present disclosure.

In the camping cart which can be folded and stored, referring to FIG. 4, the X-shaped supporting foldable part 200 comprises a third rotating element 220, a first rod 230, a second rod 240, a third rod 250 and a fourth rod 260. The third rotating element 220 is provided with two rotating installing sites. The two rotating installing sites are provided side by side and horizontally. The third rotating element 220 is provided with two sleeves. The two sleeves face opposite directions and are located on the same straight line. The first rod 230 is inserted into one of the sleeves and is rotatably connected with the lower connector 320. The second rod 240 is inserted into the other sleeve and is rotatably connected with the second rod 240 of the adjacent X-shaped supporting foldable part 200 through the first rotating element 210. One end of the third rod 250 is rotatably connected with one of the rotating installing sites, and the other end thereof is rotatably connected with the upper connector 310. The rod body of the fourth rod 260 is rotatably connected with the other rotating installation position. One end of the fourth rod 260 is rotatably connected with the first rotating element 210, and the other end thereof is fixedly connected with a slider. The slider is slidably matched with the rod body of the third rod 250 and is slidable along the third rod 250.

In the X-shaped supporting foldable part 200, the straight line where the first rod 230 and the second rod 240 are located and the straight line where the third rod 250 and the fourth rod 260 are located can rotate to each other through the two rotating installing sites of the third rotating element 220, so as to achieve the folding effect. The two adjacent X-shaped supporting foldable parts 200 can also be rotated and folded through the first rotating element 210, which is convenient to use.

Figure 2:
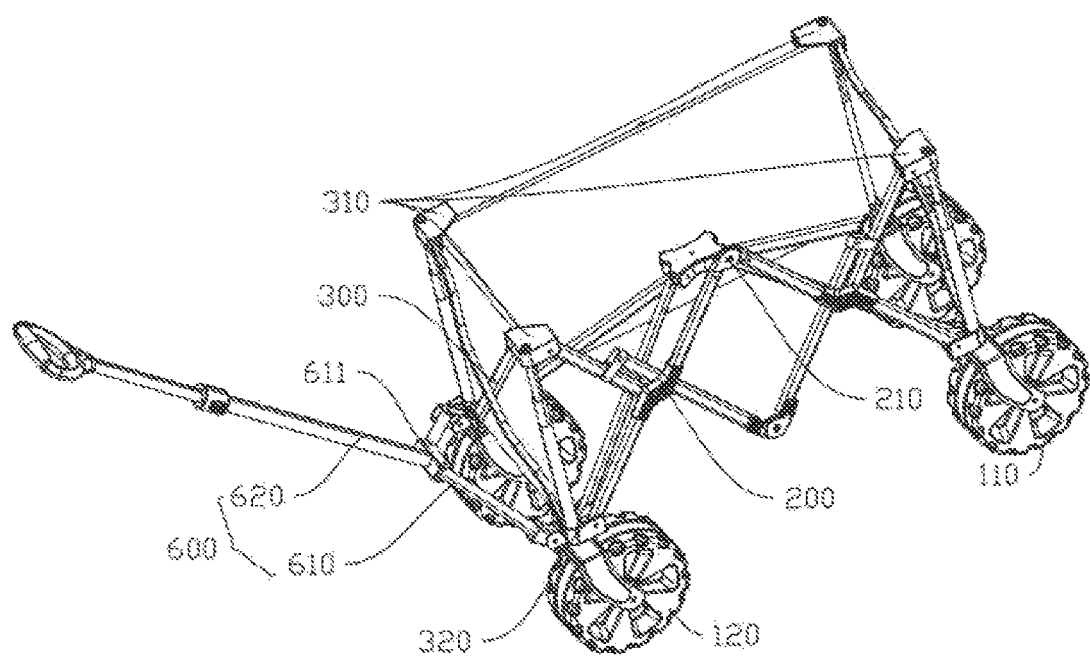
FIG. 2 is a schematic diagram of one direction of a camping cart according to an embodiment of the present disclosure.

In some embodiments, for the convenience of use, referring to FIGS. 1 and 2, the camping cart further comprises a handle assembly 600. The handle assembly 600 comprises short rods 610 and a handle rod 620. Two short rods 610 are provided in order to adapt to users of different heights. One end of each of the two short rods 610 is rotatably connected through a fourth rotating element 611, and the other end thereof is rotatably connected with two lower connectors 320, respectively. The two lower connectors 320 are provided to correspond to the two universal wheels 120, respectively. The handle rod 620 is fixedly connected with the fourth rotating element 611.

Further, in order to improve the adaptability to users of different heights, the handle rod 620 is telescopic.

The embodiments of the present disclosure have been described in detail with reference to the drawings above, but, the present disclosure is not limited to the above embodiments. Various changes can be made within the scope of knowledge possessed by those skilled in the art without departing from the purpose of the present disclosure.

What is claimed is:

1. A camping cart, comprising:
    at least one moving part, a plurality of X-shaped supporting foldable parts, a plurality of X-shaped connecting parts and four load-bearing bottom rods;
    wherein every two of the X-shaped supporting foldable parts are rotatably connected through a first rotating element to construct one side of the camping cart;
    two of the plurality of X-shaped connecting parts are connected to both ends of a respective X-shaped supporting foldable part, respectively, to construct both ends of the camping cart,
    wherein each of the two X-shaped connecting parts is connected to an upper end of the respective X-shaped supporting foldable part through an upper connector, and each of the X-shaped connecting parts is connected to a lower end of the X-shaped supporting foldable part through a lower connector;
    wherein the four load-bearing bottom rods are provided with two ends, one end of the four load-bearing bottom rods is rotatably connected to a second rotating element, and one end of each of the four load-bearing bottom rods far away from the second rotating element is rotatably connected with a respective lower connector;
    the moving part comprises two front wheels and two universal wheels, the front wheels installed at a front end of one of the X-shaped supporting foldable parts, and the universal wheels are installed at a rear end of one of the X-shaped supporting foldable parts,
    wherein a surface of the front wheels is covered with an electric conductor, each front wheel rotatably connected with a frame, each front wheel rolls pivotably in the frame, a magnet frame is built in the frame, the magnet frame is located on an upper side of each front wheel, a magnet is provided on one side of the magnet frame close to each front wheel, and the magnet frame is capable of rising and falling in the frame to adjust the distance between the magnet frame and each front wheel.

2. The camping cart according to claim 1, wherein the magnet frame (113) is connected with a stretching rod (1132), the stretching rod (1132) penetrates through the frame (112) and is movable telescopically on the frame (112), one end of the stretching rod (1132) far away from the magnet frame (113) is connected with a stretching control element, and the stretching control element is configured to control the stretching rod (1132) to extend and retract.

3. The camping cart according to claim 2, wherein the frame (112) is further inserted with a guide post (1121), the guide post (1121) is slidable on the frame (112), the end of the guide post (1121) is fixedly connected with the magnet frame (113), two guide posts (1121) are provided, the two guide posts (1121) are located on both sides of the stretching rod (1132), and a fixed plate is fixedly connected between the guide post (1121) and the stretching rod (1132).

4. The camping cart according to claim 3, wherein the guide post (1121) is sleeved with a spring (1122).

5. The camping cart according to claim 2, wherein the middle of the stretching rod (1132) is provided with a threaded section (1134), the threaded section (1134) is engaged with a positioning nut (1135), and the positioning nut (1135) abuts against the surface of the frame (112) to fix the position of the magnet frame (113).

6. The camping cart according to claim 1, wherein two magnets (1131) are provided, the two magnets (1131) are provided at an included angle, and, the magnet is tangent to the front wheel (110).

7. The camping cart according to claim 1, wherein the X-shaped supporting foldable part (200) comprises:
    a third rotating element (220), wherein the third rotating element (220) is provided with two rotating installing sites, the two rotating installing sites are provided side by side and horizontally, the third rotating element (220) is provided with two sleeves, and the two sleeves face opposite directions and are located on the same straight line;
    a first rod (230), wherein the first rod (230) is inserted into one of the sleeves and is rotatably connected with the lower connector (320);
    a second rod (240), wherein the second rod (240) is inserted into the other sleeve and is rotatably connected with the second rod (240) of the adjacent X-shaped supporting foldable part (200) through the first rotating element (210);
    a third rod (250), wherein one end of the third rod (250) is rotatably connected with one of the rotating installing sites, and the other end thereof is rotatably connected with the upper connector (310);
    a fourth rod (260), wherein the rod body of the fourth rod (260) is rotatably connected with the other rotating installation position, one end of the fourth rod (260) is rotatably connected with the first rotating element (210), and the other end thereof is fixedly connected with a slider, and the slider is slidably matched with the rod body of the third rod (250) and is slidable along the third rod (250).

8. The camping cart according to claim 1, further comprising, a cloth pocket (500), wherein the cloth pocket (500) is fixedly connected with four of the upper connectors (310) and four of the lower connectors (320).

9. The camping cart according to claim 1, further comprising a handle assembly (600), wherein the handle assembly (600) comprises:
    short rods (610), wherein two short rods (610) are provided, one end of each of the two short rods (610) is rotatably connected through a fourth rotating element (611), and the other end thereof is rotatably connected with two lower connectors (320), respectively, wherein the two lower connectors (320) are provided to correspond to the two universal wheels (120), respectively;
    a handle rod (620), wherein the handle rod (620) is fixedly connected with the fourth rotating element (611).

10. The camping cart according to claim 9, wherein the handle rod (620) is telescopic.

* * * * *